United States Patent [19]
Yumiki et al.

[11] Patent Number: 5,471,732
[45] Date of Patent: Dec. 5, 1995

[54] METHOD FOR DETACHING AND ATTACHING A ROTARY CYLINDER

[75] Inventors: Naoto Yumiki, Hirakata; Hironori Honsho, Neyagawa, both of Japan

[73] Assignee: Matsushita Electric Industrial Co., Ltd., Osaka, Japan

[21] Appl. No.: 159,147

[22] Filed: Nov. 30, 1993

[30] Foreign Application Priority Data

Nov. 30, 1992 [JP] Japan ..................... 4-319673

[51] Int. Cl.⁶ ................................................ H02K 15/14
[52] U.S. Cl. ..................... 29/596; 29/603; 29/898.07; 29/898.08; 310/42; 310/90
[58] Field of Search ..................... 29/596, 603, 898.07, 29/898.08; 310/42, 90

[56] References Cited

FOREIGN PATENT DOCUMENTS 2-92809   7/1990   Japan.
2-117709  9/1990   Japan.
4-192108  7/1992   Japan.

*Primary Examiner*—Carl E. Hall
*Attorney, Agent, or Firm*—Wenderoth, Lind & Ponack

[57] ABSTRACT

When detaching or attaching a rotary cylinder in a rotary cylinder device having a hydrodynamic bearing, a gap is formed between the end surface of a shaft and a thrust plate and this gap is maintained by inserting an insertion member between opposing surfaces of stronger parts of the device. In this state, the rotary cylinder is removed from or assembled to the device. Accordingly, the force required to remove or fix the cylinder from or to the device acts on the stronger parts of the device and is thus not transmitted to the thrust plate and end surface of the shaft.

16 Claims, 6 Drawing Sheets

METHOD FOR DETACHING AND ATTACHING A ROTARY CYLINDER

BACKGROUND OF THE INVENTION

1. Field of the Invention

The present invention relates to a method of replacing a rotary cylinder on which magnetic rotary heads are mounted, in a rotary cylinder device of a video tape recorder (hereinafter called VTR) or the like.

2. Description of the Prior Art

Recently there is a mounting demand for recording and reproducing apparatus capable of recording information with high density and transmitting information at high rates. Such apparatus include digital VTRs and VTRs for high definition television (for example, Hi-Vision) in which the picture quality is very much enhanced in comparison with existing television systems. In such apparatus in which information on a magnetic tape is recorded and reproduced by magnetic rotary heads, the quantity of information which can be recorded in an area of magnetic tape is referred to as the recording density. Narrowing the tracks recorded on a magnetic tape has been considered in connection with increasing recording density. Moreover, the width of the frequency band and the wavelengths of the signals to be recorded will depend upon the width of the recording tracks. Therefore, it is necessary to increase the rotating speed of the rotary cylinder of the apparatus the larger the width of the frequency band and the smaller the wavelengths of the recorded signals become. At higher density recording, however, the magnetic rotary head may fail to trace the track correctly at the time of reproduction of the signals, or the noise produced by the bearing may increase with increases in the rotary speed of the rotary cylinder. Accordingly, a hydrodynamic bearing that is more precise and less noisy than a ball bearing is used in the rotary cylinder device.

The apparatus also includes a stationary cylinder for guiding a magnetic tape, and a stationary shaft having herringbone grooves at two positions on the outer circumference thereof and at an upper end surface thereof. The stationary shaft is press-fitted to a central part of the stationary cylinder. A sleeve mounted coaxially with and rotatable relative to the stationary shaft has a bearing surface confronting the herringbone grooves, and is supported by a disk. A thrust plate has a spiral groove in its lower end surface, and is fastened with a screw to the upper end surface of the sleeve so as to confront the upper end surface of the stationary shaft. A small gap between the herringbone groove and the bearing surface, and a small gap between the upper end surface of the stationary shaft and the spiral groove are filled with lubricant. The rotary cylinder carries magnetic rotary heads which project a specified amount so as to contact the magnetic tape. This cylinder extends coaxially with the disk, and is detachably fixed thereto with a screw. A rotary transformer for transmitting a signal includes a stationary portion and a rotary portion. A motor for rotating and driving the rotary portion comprises a motor magnet fixed to the disk, and a motor coil fixed to the stationary cylinder.

A method of detaching and attaching the rotary cylinder will be described below.

When an electric current flows in the motor coil, and the rotary portion of the device (including the sleeve) rotates, the centripetal nature of the rotary portion is maintained by the pumping action of the radial bearing composed of the herringbone groove, bearing surface, and lubricant. Furthermore, the thrust bearing, composed of the spiral groove, upper end surface of the stationary shaft, and lubricant, performs a pumping action that ensures that the rotary portion floats at a stable position on the stationary portion of the device, whereby normal rotation is maintained. However, the magnetic rotary heads become worn over time due to contact of the magnetic tape and the magnetic rotary heads, whereupon the extent to which the heads project from the rotary cylinder becomes smaller such that the quality of the recording and reproducing becomes unsatisfactory. Therefore, when the magnetic rotary heads are worn, generally, the rotary cylinder on which the magnetic rotary heads are mounted is replaced with a new one. In such a case, to dismount the rotary cylinder, the screw is loosened from the disk, and the rotary cylinder is pulled from the disk upward while pressing downward on the upper end surface of the thrust plate. On the contrary, to mount the new rotary cylinder, the inner circumference of the rotary cylinder and the outer circumference of the disk are coaxially fitted to another, and a screw is inserted into the threaded hole of the disk.

In such a method, however, dynamic pressure is not present in the bearing because the rotary portion has been stopped. Therefore, the outer circumference of the shaft and the bearing surface of the sleeve, and the lower end surface of the thrust plate and the upper end surface of the shaft contact each other. Accordingly, when detaching and attaching the rotary cylinder and disk, the sleeve, thrust plate and shaft nearly contact each other, and an external force is transmitted by the screw to the bearings. As a result, the sleeve or thrust plate may be damaged, and the rotary portion may not rotate normally after replacement, and the bearing life is also shortened. Furthermore, damage to the radial bearing causes the shaft of the stationary portion to become loose, and therefore the tracking of the magnetic tape by the magnetic rotary heads is impaired.

SUMMARY OF THE INVENTION

It is hence a primary object of the invention to present a method for detaching and attaching a rotary cylinder without damaging a bearing and a shaft despite a large force being used to effect such a detaching or attaching of the rotary cylinder.

To achieve the object, the invention presents a method for detaching and attaching a rotary cylinder of a rotary cylinder device which includes moving opposing surfaces of a stationary portion and a rotary portion of the rotary cylinder device apart from one another to widen and maintain an appropriate gap between the rotary portion and the stationary portion during the fixing and unfixing of the rotary cylinder.

More specifically, a rotary cylinder device to which the present invention is applicable comprises: a stationary portion which comprises a stationary cylinder, a shaft fitted to the stationary cylinder, and a part of a motor mounted on the stationary cylinder; and a rotary portion which comprises a disk mounted on the shaft via a hydrodynamic bearing so as to be rotatable about the shaft and movable by a certain extent in a longitudinal direction of the shaft, a rotary cylinder disposed coaxially with the disk and fixed to the disk with a fixing member, a magnetic head mounted on the rotary cylinder, a thrust plate fixed to the disk and opposing an upper end surface of the shaft, and another part of the motor mounted on the disk. Another rotary cylinder device to which the present invention is applicable comprises: a stationary portion which comprises a stationary cylinder, a thrust plate fixed to the stationary cylinder and opposing a lower end surface of a shaft, and a part of a motor mounted on the stationary cylinder; and a rotary portion which comprises the aforementioned shaft which is mounted on the stationary cylinder via a hydrodynamic bearing so as to be rotatable with respect to the stationary cylinder and movable by a certain extent in a longitudinal direction of the shaft, a disk mounted on the shaft, the rotary cylinder being disposed coaxially with the disk and fixed to the disk with a fixing member, a magnetic head mounted on the rotary cylinder, and another part of the motor mounted on the disk. In each of the above-described rotary cylinder devices, the rotary part has a first surface lying perpendicular to the axis of rotation of the rotary cylinder and the stationary part has a second surface lying perpendicular to the axis of rotation of the rotary cylinder and confronting the first surface. A first gap is established between these surfaces when the rotary cylinder is rotating, and a second gap smaller than the first gap exists between the surfaces when the rotary cylinder is stopped. The rotary cylinder is detached by a method comprising the steps of: spacing the surfaces apart from one another to such an extent that the gap between the first surface and the second surface is wider than the second gap; subsequently removing the fixing member from the rotary cylinder; and detaching the rotary cylinder from the disk. A new rotary cylinder is attached by a method comprising the steps of: spacing the surfaces apart from one another to such an extent that the gap between the first surface and the second surface is wider than the second gap; placing a new rotary cylinder supporting a magnetic head on the disk so as to be coaxial with the disk; and subsequently fixing the new rotary cylinder to the disk with a fixing member. When replacing a rotary cylinder of a rotary cylinder device with a new rotary cylinder, the spacing of the first and second surfaces may be maintained while the fixing member is removed and secured.

When detaching and attaching the rotary cylinder, the spacing of the surfaces ensures that a corresponding gap is provided between the end surface of the shaft and the abutting surface of the thrust plate. As a result, even if a large external force is applied to the rotary cylinder, an excessive force is not transmitted therefrom to the sleeve, the thrust plate and the shaft. Accordingly, the sleeve and the thrust plate will not be damaged nor will the shaft loosen. Therefore, even if the rotary cylinder is replaced, the precision of the rotary cylinder device will remain substantially the same as that before the magnetic rotary head was worn.

DETAILED DESCRIPTION OF THE PREFERRED EMBODIMENTS

Figure 1:
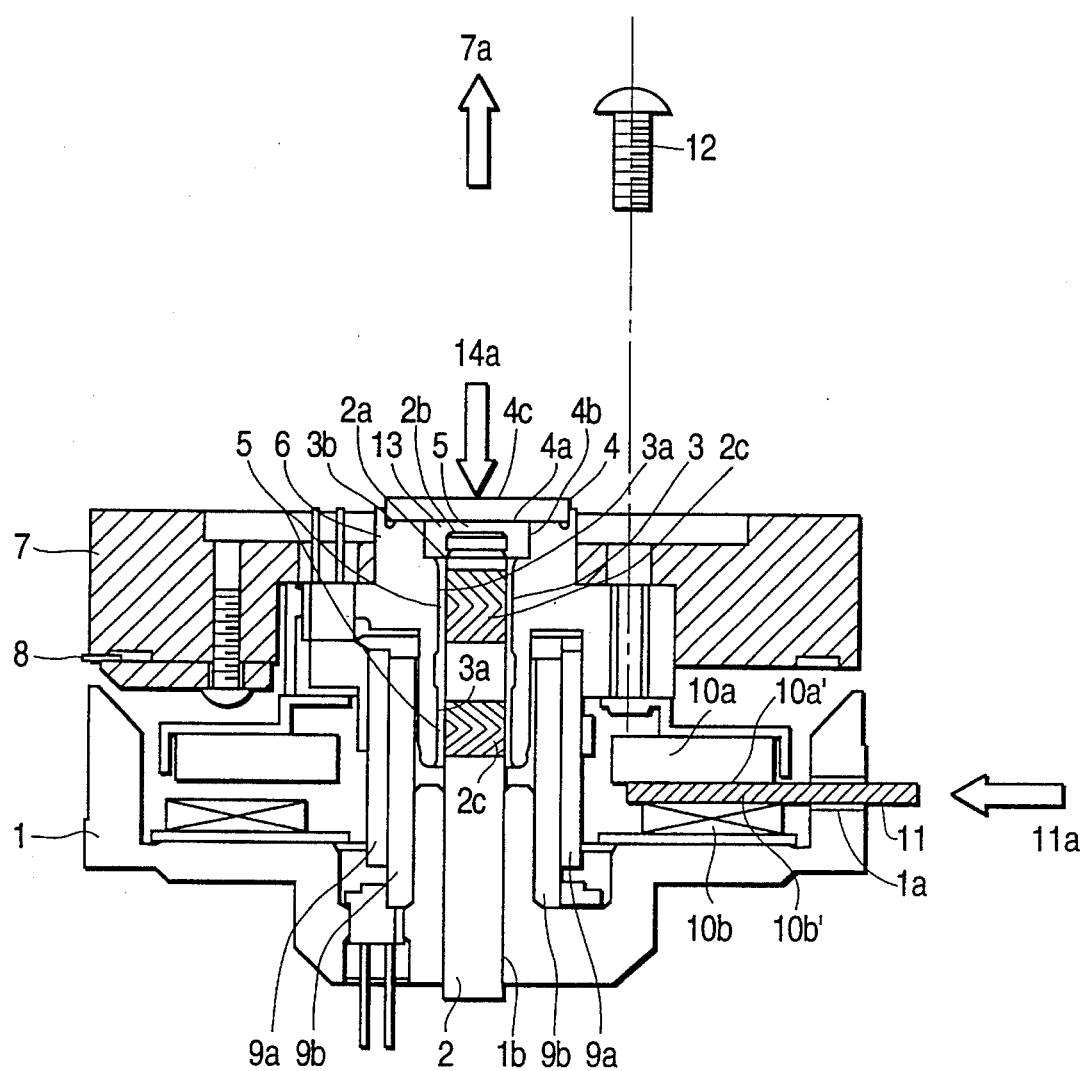
FIG. 1 is a diagram of a rotary cylinder device showing the state in which a rotary cylinder is to be dismounted according to the invention.
Figure 2:
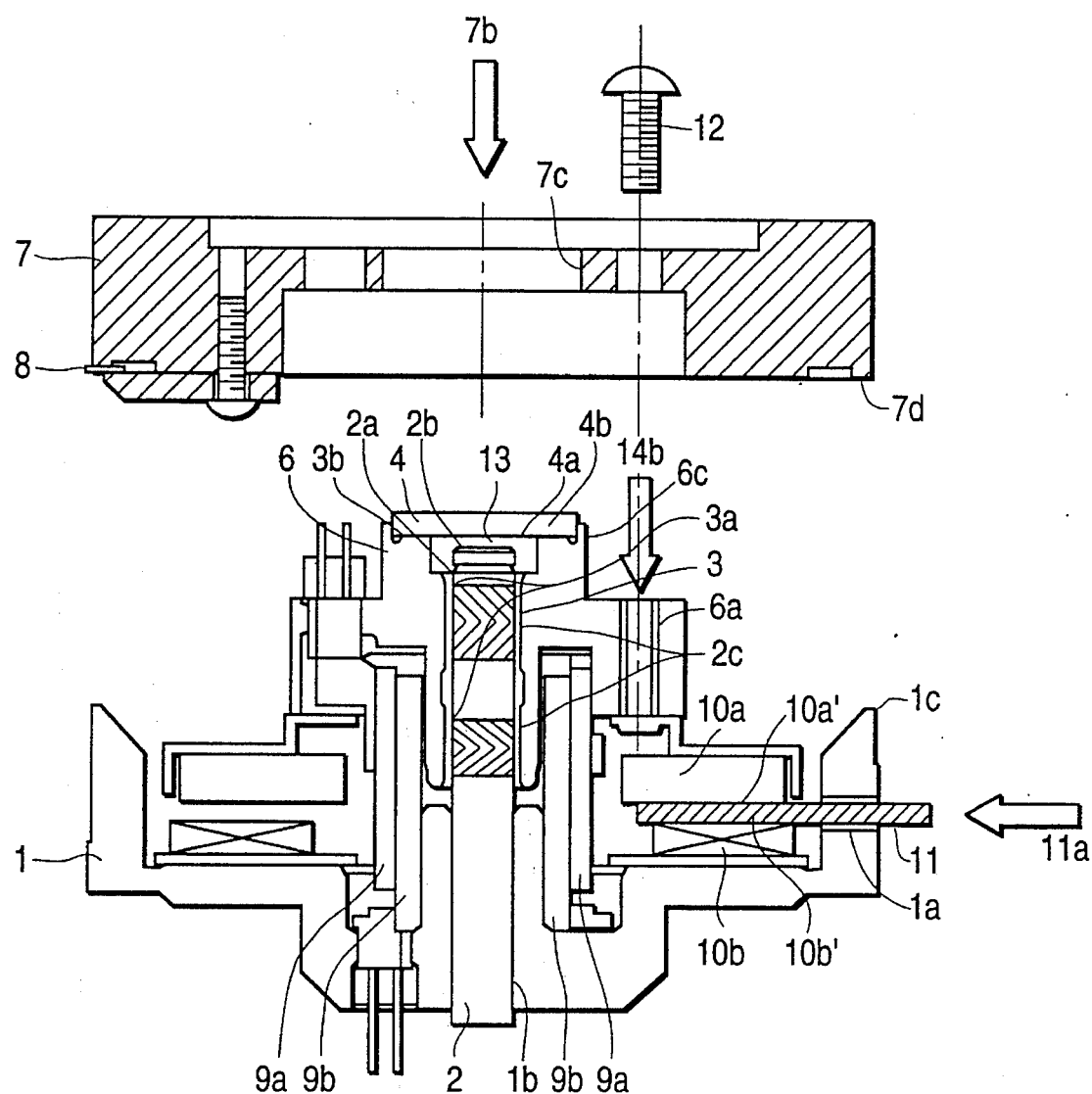
FIG. 2 is a similar diagram but showing the state in which the rotary cylinder is to be mounted.

A first embodiment of a method of detaching and attaching a rotary cylinder according to the invention will be described below with reference to FIGS. 1, 2, and 6.

Numeral 1 denotes a stationary cylinder for guiding a magnetic tape (not shown), and numeral 2 denotes a stationary shaft press-fitted to a central part 1b of the stationary cylinder. The stationary shaft 2 has herringbone grooves 2c formed, for example, by etching the outer circumference 2a of the shaft at two axially spaced-apart locations, and by etching an upper end surface 2b of the shaft. Numeral 3 denotes a sleeve, which is coaxial with and rotatable relative to the stationary shaft 2. The sleeve 3 has an inner circumferential bearing surface 3a confronting the herringbone grooves 2c, and is held by a disk 6. Numeral 4 denotes a thrust plate having a spiral groove 4b defined on a lower end surface 4a thereof. The thrust plate 4 is fastened with screws to the upper end surface 3b of the sleeve 3, and confronts the upper end surface 2b of the stationary shaft 2. Numeral 7 denotes a rotary cylinder extending coaxially to the disk 6, and detachably fixed thereto with a screw 12. Numeral 5 denotes a lubricant filling a small gap between the herringbone grooves 2c and bearing surface 3a, and a small gap between the upper end surface 2b of the stationary shaft 2 and the spiral groove 4b at the time of rotation of the rotary cylinder 7. Incidentally, a stopper ring 2e prevents the rotary cylinder 7 from slipping off of the shaft 2 by abutting against the end surface 6d of the disk 6 (see FIG. 6). Numeral 8 denotes a magnetic head fastened by a screw to the rotary cylinder 7, and provided with a certain projection in order to contact magnetic tape. Rotary transformers 9a, 9b are for transmitting signals without making contact, and numeral 10 denotes a motor consisting of a motor magnet 10a fixed to the disk 6, and a motor coil 10b fixed to the stationary cylinder 1. Numeral 11 denotes an insertion member for creating a gap 13 between the upper end surface 2b of the shaft and the lower end surface 4a of the thrust plate, by being inserted, in the direction 11a, between the lower end surface 10a' of the motor magnet and the upper end surface 10b' of the motor coil from the direction of 11a through an insertion hole 1a provided in the stationary cylinder 1 at a location where the magnetic tape does not run.

Figure 6:
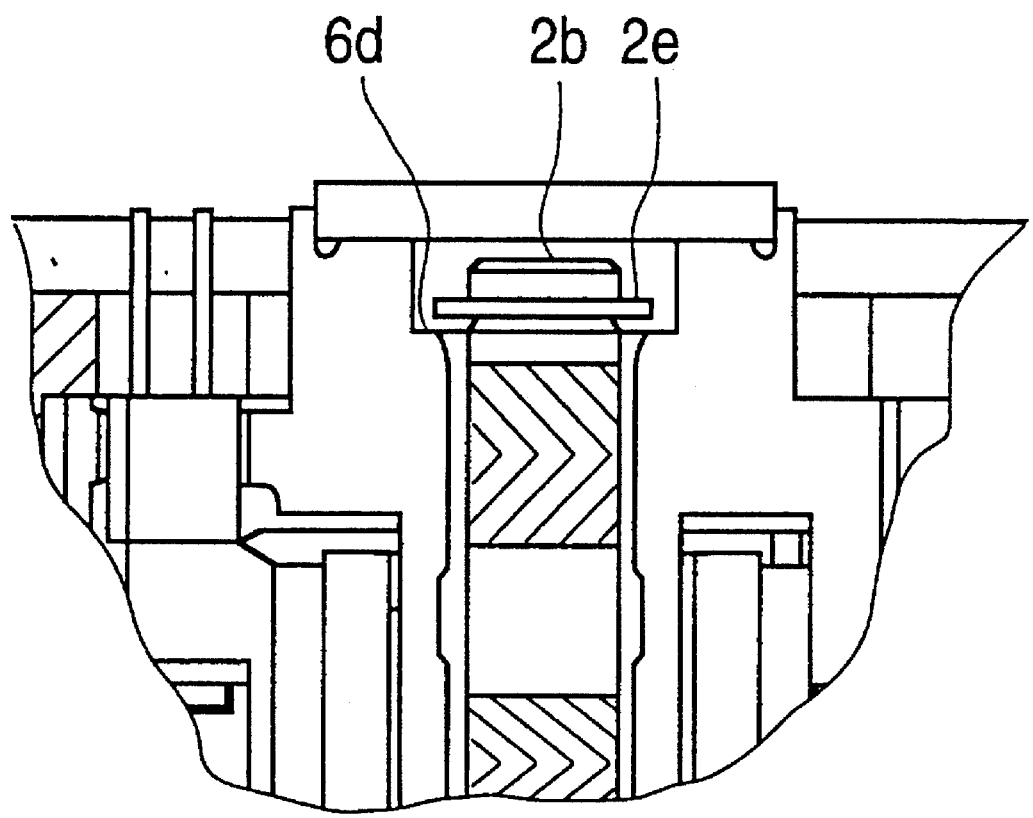
FIG. 6 is an enlarged view of essential parts of a rotary cylinder device for use in describing the method of the present invention.

To detach the rotary cylinder 7, a rotary portion of the device is lifted upward in the axial direction of shaft 2 until the end surface 6d of the disk and the stopper ring 2e abut each other (see FIG. 6). In this state, the insertion member 11 is inserted in direction 11a in a gap now formed between the lower end surface 10a' of the motor magnet and the upper end surface 10b' of the motor coil, to thereby maintain the gap 13 between the upper end surface 2b of the shaft and the lower end surface 4a of the thrust plate. Next, the screw 12 is removed, thereby releasing the rotary cylinder 7 from the disk 6. Furthermore, while pressing the upper end surface 4c of the thrust plate in the direction 14a, the rotary cylinder 7 is withdrawn from the disk 6 in the direction 7a. Note, an external force is applied in the direction 14a while removing the screw 12 and while withdrawing the rotary cylinder 7 from the disk 6. However, due to the insertion member 11, the upper end surface 2b of the shaft is prevented from contacting the lower end surface 4a of the thrust plate. Therefore, the external force is transmitted to the insertion member 11, the motor magnet 10a and the motor coil 10b having strength greater than that of the bearing so that a large force is not applied to the bearing. To the contrary, to mount the rotary cylinder 7, the rotary portion is lifted upward in the axial direction until the end surface 6d of the disk and the stopper ring 2e abut each other (see FIG. 6), and the insertion member 11 is inserted in the direction 11a into the gap between the lower end surface 10a' of the motor magnet and the upper end surface 10b' of the motor coil such that a gap 13 is maintained between the upper end surface 2b of the shaft and the lower end surface 4a of the thrust plate. Next, the rotary cylinder 7 and the disk 6 are fitted to one another so as to be coaxial and are fastened together by inserting the screw 12 into the screw hole 6a of the disk 6. When fitting the rotary cylinder 7 to the disk 6 or fastening these members together with the screw 12, a force is applied in direction 14a. However, the insertion member 11 prevents the upper end surface 2b of the shaft from contacting the lower end surface 4a of the thrust plate. That is, the external force is applied to the insertion member 11, the motor magnet 10a and the motor coil 10b having strength greater than that of the bearing, so that a large force is not applied to the bearing. In this way, when replacing the rotary cylinder 7, the sleeve 3 and thrust plate 4 are not damaged nor will the shaft 2 become loose at the stationary portion 1b of the shaft 2. As a result, the level of precision of the rotary cylinder device is equal to that before the magnetic head 8 has become worn.

Figure 3:
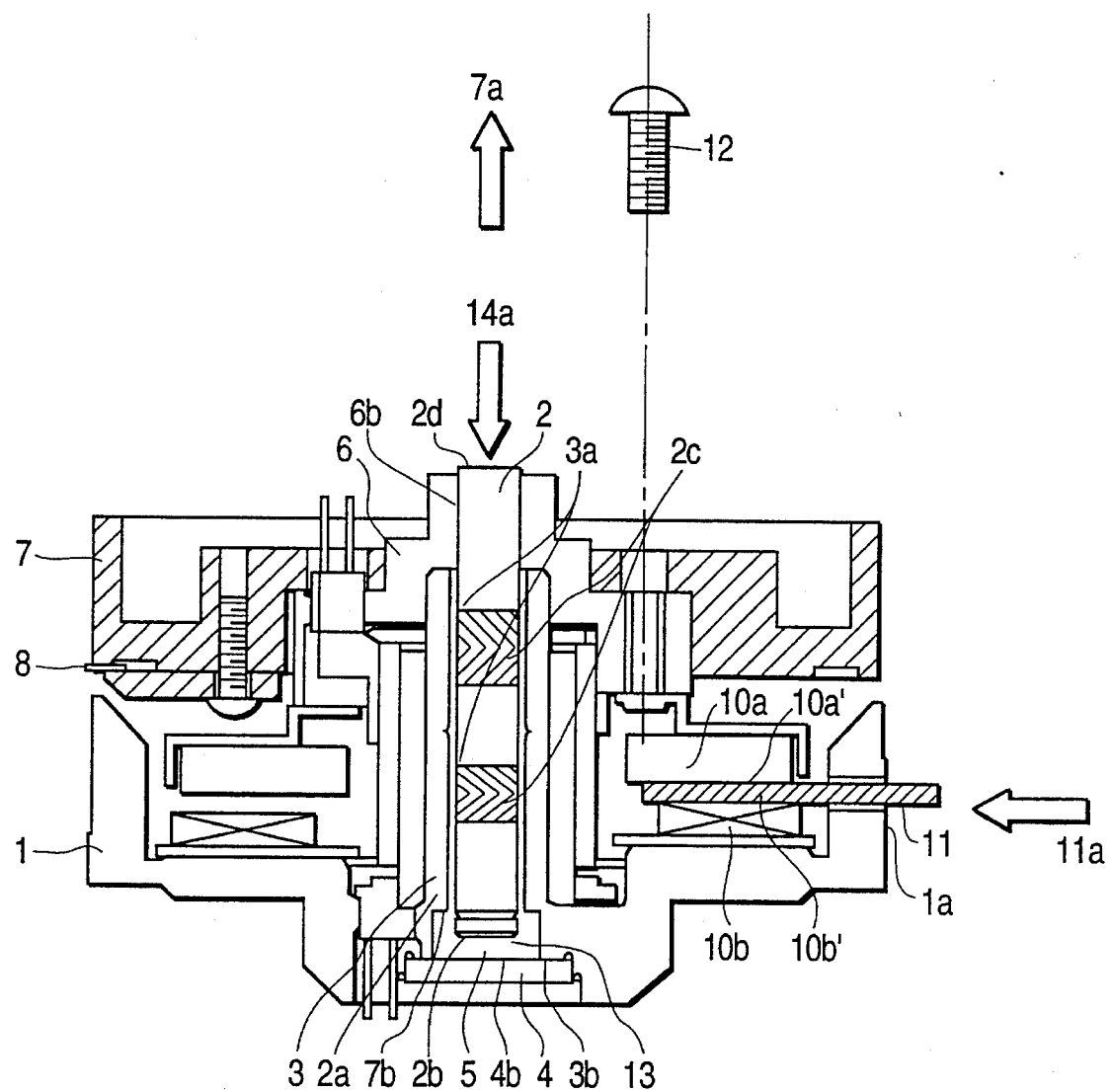
FIG. 3 is a diagram of another rotary cylinder device showing the state in which the rotary cylinder thereof is to be mounted.
Figure 4:
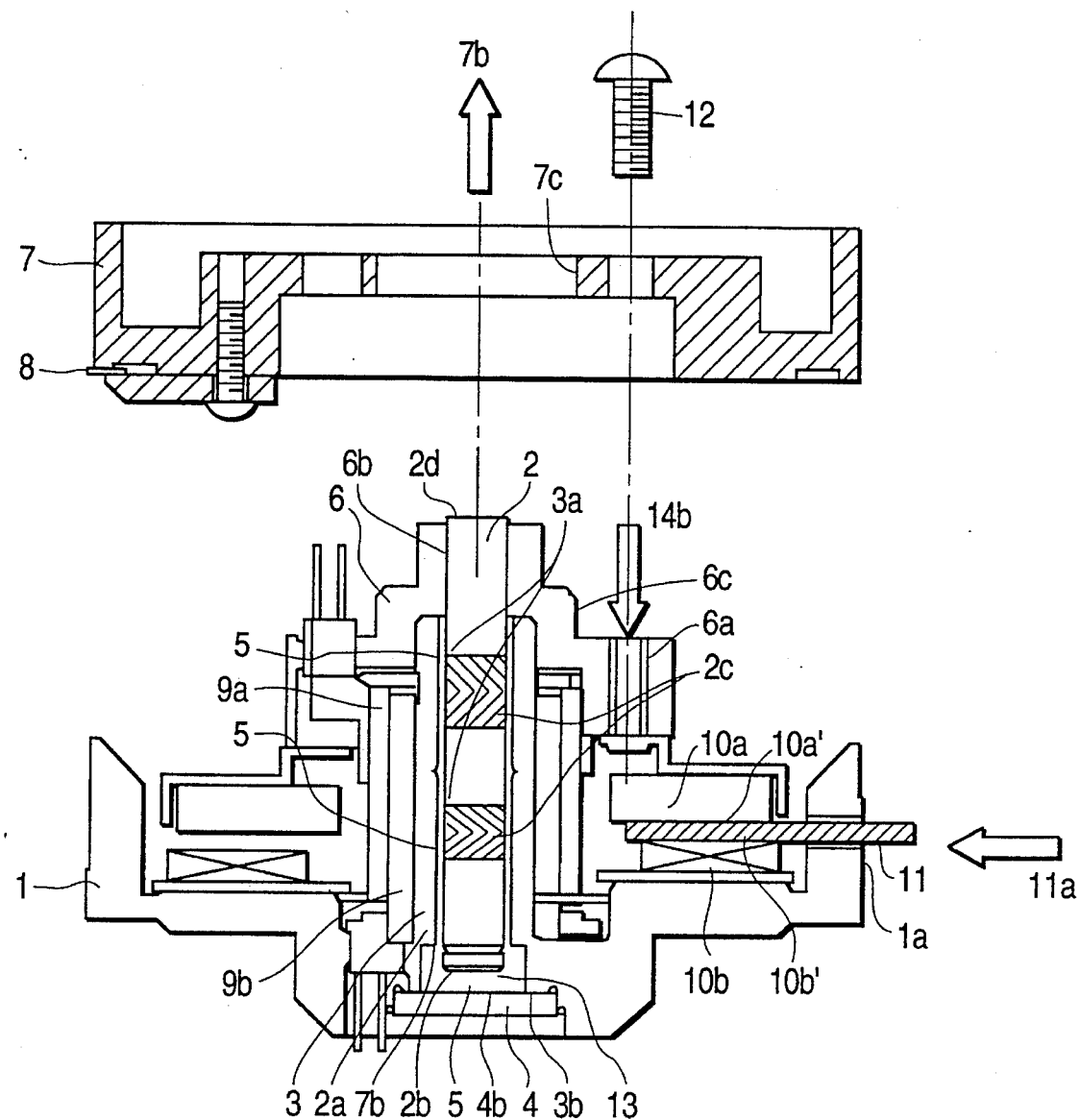
FIG. 4 is a diagram of the rotary cylinder device shown in FIG. 3 but showing the state in which the rotary cylinder is to be mounted.

A second embodiment will next be described below while referring to FIGS. 3 and 4. The same parts in the device shown in FIGS. 1 and 2 are identified with the same reference numerals, and descriptions of such parts will be omitted.

Numeral 1 denotes a stationary cylinder for guiding a magnetic tape (not shown). Numeral 2 denotes a rotary shaft press-fitted to a central part 6b of a disk 6. Numeral 3 denotes a sleeve, which has a bearing surface 3a confronting the herringbone grooves 2c, and is held by the stationary cylinder 1. Numeral 4 denotes a thrust plate having a spiral groove 4b defined on an upper end surface 4a thereof. The thrust plate 4 is fastened with screws to the lower end surface 3b of the sleeve 3, and confronts the lower end surface 2b of the rotary shaft 2.

To detach the rotary cylinder 7, a rotary portion of the device is lifted upward in the axial direction of shaft 2 until the stopper ring 2e abuts the end surface 6d of the disk. In this state, the insertion member 11 is inserted in direction 11a in a gap now formed between the lower end surface 10a' of the motor magnet and the upper end surface 10b', to thereby maintain the gap 13 between the lower end surface 2b of the shaft and the upper end surface 4a of the thrust plate. Next, the screw 12 is removed, thereby releasing the rotary cylinder 7 from the disk 6. Furthermore, while pressing the upper end surface 2d of the rotary shaft 2 in direction 14a, the rotary cylinder 7 is withdrawn from the disk 6 in the direction of 7a. Note, an external force is applied in the direction 14a while removing the screw 12 and while withdrawing the rotary cylinder 7 from the disk 6. However, due to the insertion member 11, the lower end surface 2b of the shaft is prevented from contacting the upper end surface 4a of the thrust plate. Therefore, the external force is transmitted to the insertion member 11, the motor magnet 10a and the motor coil 10b having strength greater than that of the bearing, so that a large force is not applied to the bearing. To the contrary, to mount the rotary cylinder 7, the rotary portion is lifted upward in the axial direction until the end surface 6d of the disk and the stopper ring 2e abut each other, and the insertion member 11 is inserted in direction 11a into the gap between the lower end surface 10a' of the motor magnet and the upper end surface 10b' of the motor coil such that a gap 13 is maintained between the lower end surface 2b of the shaft and the upper end surface 4a of the thrust plate. Next, the rotary cylinder 7 and the disk 6 are fitted to one another, and fastened together by inserting the screw 12 into the screw hole 6a of the disk 6. When fitting the rotary cylinder 7 to the disk 6 or fastening these members together with the screw 12, a force is applied in direction of 14a. However, the insertion member 11 prevents the lower end surface 2b of the shaft from contacting the upper end surface 4a of the thrust plate. That is, the external force is applied to the insertion member 11, the motor magnet 10a and the motor coil 10b having strength greater than that the bearing, so that a large force is not applied to the bearing. As in the first embodiment, when replacing the rotary cylinder 7, the sleeve 3 and thrust plate 4 are not damaged. Further, the disk 6 will not become loose at the stationary portion 6b of the disk 6. As a result, the level of precision of the rotary cylinder device will be equal to that before the magnetic head 8 has become worn.

Figure 5:
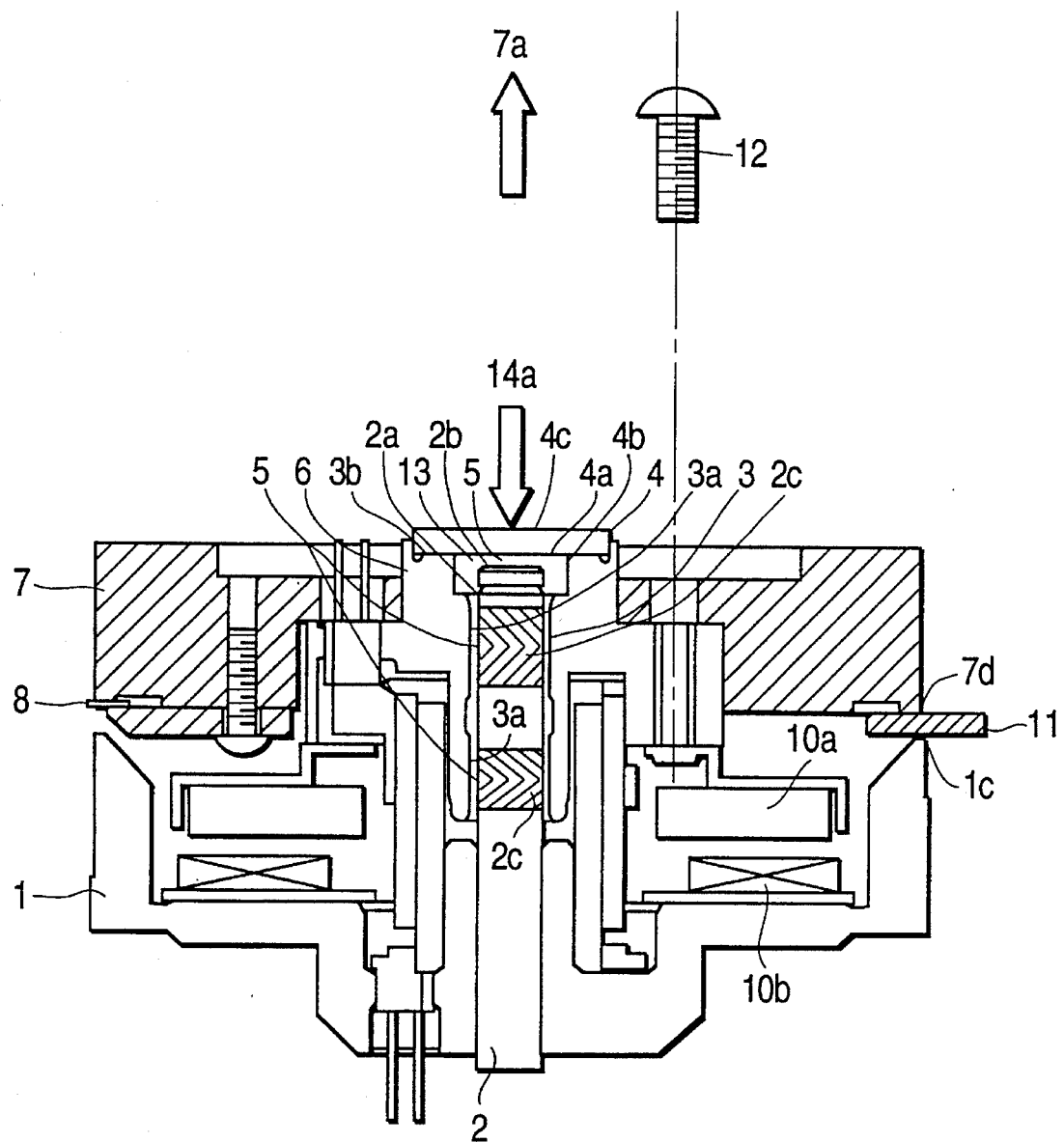
FIG. 5 is a diagram of still another rotary cylinder device showing the state in which the rotary cylinder thereof is to be mounted according to the invention.

A third embodiment will next be described referring to FIGS. 5 and 6.

As in the first and second embodiments, when detaching the rotary cylinder 7, the rotary portion is lifted in the axial direction until a surface thereof abuts against the stopper ring 2e (see FIG. 6), and the insertion member 11 is inserted between the lower end surface 7d at the outermost circumference of the rotary cylinder 7 and the upper end surface 1c at the outermost circumference of the stationary cylinder 1 where the magnetic head 8 is not located. The subsequent steps are the same as in those described in connection with the first and second embodiments.

Because the insertion member 11 is inserted between the lower end surface 7d of the rotary cylinder and the upper end surface 1c of the stationary cylinder, it is not necessary to form the insertion hole 1a (see FIGS. 1 to 4) in the stationary cylinder 1, whereby the strength of the stationary cylinder 1 is maintained. Moreover, although FIG. 5 shows an insertion member 11 being inserted at only one location, similar insertion members may be inserted at a plurality of locations where the magnetic head 8 is not found. By using plural insertion members, the gap 13 between the upper end surface 2b of the shaft 2 and the lower end surface 4a of the thrust plate 4 can be stably maintained, and the rotary cylinder 7 can be replaced with a smaller load being exerted on the shaft 2.

Further, although the herringbone grooves 2c have been described as being etched in the outer circumference of the shaft 2, they may instead be machined in the inner circumference of the sleeve. In the first embodiment, instead of providing the spiral groove 4b in the lower end surface of the thrust plate 4, it may be provided in the upper end surface of the shaft 2. In the second embodiment, instead of providing the spiral groove 4b in the upper end surface of the thrust plate 4, it may be provided in the lower end surface of the shaft 2.

The gap 13 between the shaft end surface 2b and the thrust plate 4 is maintained by inserting the insertion member 11 between opposing surfaces of the device. However, the gap 13 can be maintained by other methods, such as by the use of piezoelectric element.

The end surface of the shaft 2 is kept from contacting the thrust plate 4 by forming a gap between the lower end surface 10a' of the motor magnet and the upper end surface 10b' of the motor coil, or between the lower end surface 7d of the rotary cylinder 7 and the upper end surface 1c of the stationary cylinder 1. Alternatively, however, the gap may be formed between any surfaces that become vertically spaced apart when the rotary cylinder 7 is rotating. Therefore, the present invention cannot only be applied to a device having a confronting type of motor but may be also applied to a device having a peripheral confronting type of motor, i.e. a motor having a concentric coil and magnet.

All such changes and modifications are seen to be within the true spirit and scope of the invention as defined by the appended claims.

What is claimed is:

1. A method for detaching a rotary cylinder of a rotary cylinder device having a stationary portion which comprises a stationary cylinder, a shaft fitted to the stationary cylinder, and a part of a motor mounted on the stationary cylinder; and a rotary portion which comprises a disk mounted on the shaft via a hydrodynamic bearing in such a manner as to be rotatable about the shaft and movable to a certain extent longitudinally of the shaft, a rotary cylinder disposed coaxially with the disk, a fixing member fixing the rotary cylinder to the disk, a magnetic head mounted on the rotary cylinder, a thrust plate fixed to the disk and opposing an upper end surface of the shaft, and another part of the motor mounted on the disk, and wherein the rotary portion has a first surface extending perpendicular to the axis of rotation of the rotary cylinder, and the stationary portion has a second surface extending perpendicular to the axis of rotation of the rotary cylinder and confronting the first surface, a first gap being established between the first surface and the second surface when the rotary cylinder is rotating, and a second gap narrower than the first gap existing between the first surface and the second surface when the rotary cylinder is stopped, said method comprising:

spacing the first surface and the second surface apart from each other to such an extent that the gap between the first surface and the second surface is wider than the second gap;

removing the fixing member from the rotary cylinder while the gap between the first surface and the second surface is wider than the second gap; and subsequently taking the rotary cylinder off of the disk.

2. A method according to claim 1, wherein said spacing of the surfaces apart from each other comprises inserting an insertion member having a thickness greater than the width of the second gap between the first surface and the second surface while the rotary cylinder is stopped.

3. A method according to claim 2, wherein the part of the motor mounted on the stationary cylinder is a motor magnet and the part of the motor mounted on the disk is a motor coil, and wherein said insertion member is inserted between a surface of the motor coil constituting the first surface and a surface of the motor magnet constituting the second surface.

4. A method according to claim 2, wherein said insertion member is inserted between the first surface at the outermost circumference of the rotary cylinder and the second surface at the outermost circumference of the stationary cylinder.

5. A method for attaching a rotary cylinder of a rotary cylinder device having a stationary portion which comprises a stationary cylinder, a shaft fitted to the stationary cylinder, and a part of a motor mounted on the stationary cylinder; and a rotary portion which comprises a disk mounted on the shaft via a hydrodynamic bearing in such a manner as to be rotatable about the shaft and movable to a certain extent longitudinally of the shaft, a rotary cylinder disposed coaxially with the disk, a fixing member fixing the rotary cylinder to the disk, a magnetic head mounted on the rotary cylinder, a thrust plate fixed to the disk and opposing an upper end surface of the shaft, and another part of the motor mounted on the disk, and wherein the rotary portion has a first surface extending perpendicular to the axis of rotation of the rotary cylinder, and the stationary portion has a second surface extending perpendicular to the axis of rotation of the rotary cylinder and confronting the first surface, a first gap being established between the first surface and the second surface when the rotary cylinder is rotating, and a second gap narrower than the first gap existing between the first surface and the second surface when the rotary cylinder is stopped, said method comprising:

providing the rotary cylinder device in an assembly state in which the rotary cylinder has not yet been fixed to the disk;

spacing the first surface and the second surface apart from each other to such an extent that the gap between the first surface and the second surface is wider than the second gap;

placing the rotary cylinder on the disk so as to be coaxial with the disk; and fixing the new rotary cylinder to the disk with a fixing member while the gap between the first surface and the second surface is wider than the second gap.

6. A method according to claim 5, wherein the spacing of the surfaces apart from each other comprises inserting an insertion member having a thickness greater than the width of the second gap between the first surface and the second surface while the rotary cylinder is stopped.

7. A method according to claim 6, wherein the part of the motor mounted on the stationary cylinder is a motor magnet and the part of the motor mounted on the disk is a motor coil, and wherein said insertion member is inserted between a surface of the motor coil constituting the first surface and a surface of the motor magnet constituting the second surface.

8. A method for replacing a rotary cylinder of a rotary cylinder device having a stationary portion which comprises a stationary cylinder, a shaft fitted to the stationary cylinder, and a part of a motor mounted on the stationary cylinder; and a rotary portion which comprises a disk mounted on the shaft via a hydrodynamic bearing in such a manner as to be rotatable about the shaft and movable to a certain extent longitudinally of the shaft, a rotary cylinder disposed coaxially with the disk, a fixing member fixing the rotary cylinder to the disk, a magnetic head mounted on the rotary cylinder, a thrust plate fixed to the disk and opposing an upper end surface of the shaft, and another part of the motor mounted on the disk, and wherein the rotary portion has a first surface extending perpendicular to the axis of rotation of the rotary cylinder, and the stationary portion has a second surface extending perpendicular to the axis of rotation of the rotary cylinder and confronting the first surface, a first gap being established between the first surface and the second surface when the rotary cylinder is rotating, and a second gap narrower than the first gap existing between the first surface and the second surface when the rotary cylinder is stopped, said method comprising:

spacing the first surface and the second surface apart from each other to such an extent that the gap between the first surface and the second surface is wider than said second gap;

removing the fixing member from the rotary cylinder while the gap between the first surface and the second surface is wider than the second gap;

subsequently taking the rotary cylinder off of the disk;

placing a new rotary cylinder on the disk so as to be coaxial with the disk; and fixing the new rotary cylinder to the disk with the fixing member while the gap between the first surface and the second surface is wider than the second gap.

9. A method for detaching a rotary cylinder of a rotary cylinder device having a stationary portion which comprises a stationary cylinder, a thrust plate fixed to the stationary cylinder, and a part of a motor mounted on the stationary cylinder; and a rotary portion which comprises a shaft mounted on the stationary cylinder via a hydrodynamic bearing so as to be rotatable with respect to the stationary cylinder and axially movable to a certain extent, the shaft having a lower end surface opposing the thrust plate, a disk mounted on the shaft, a rotary cylinder disposed coaxially with the disk, a fixing member fixing the rotary cylinder to the disk, a magnetic head mounted on the rotary cylinder, and another part of the motor mounted on the disk, wherein the rotary portion has a first surface extending perpendicular to the axis of rotation of the rotary cylinder and the stationary part has a second surface extending perpendicular to the axis of rotation of the rotary cylinder and confronting the first surface, a first gap being established between the first surface and the second surface when the rotary cylinder is rotating, and a second gap smaller than the first gap existing between the first surface and the second surface when the rotary cylinder is stopped, said method comprising:

spacing the first surface and the second surface apart from each ether to such an extent that the gap between the first surface and the second surface is wider than the second gap;

removing the fixing member from the rotary cylinder while the gap between the first surface and the second surface is wider than second gap; and subsequently taking the rotary cylinder off of the disk.

10. A method according to claim 9, wherein said spacing of the surfaces apart from each other comprises inserting an insertion member having a thickness greater than the width of the second gap between the first surface and the second surface while the rotary cylinder is stopped.

11. A method according to claim 10, wherein the part of the motor mounted on the stationary cylinder is a motor magnet and the part of the motor mounted on the disk is a motor coil, and wherein said insertion member is inserted between a surface of the motor coil constituting the first surface and a surface of the motor magnet constituting the second surface.

12. A method according to claim 10, wherein said insertion member is inserted between the first surface at the outermost circumference of the rotary cylinder and the second surface at the outermost circumference of the stationary cylinder.

13. A method for attaching a rotary cylinder of a rotary cylinder device comprising: a stationary portion which comprises a stationary cylinder, a thrust plate fixed to the stationary cylinder, and a part of a motor mounted on the stationary cylinder; and a rotary portion which comprises a shaft mounted on the stationary cylinder via a hydrodynamic bearing so as to be rotatable with respect to the stationary cylinder and axially movable to a certain extent, the shaft having a lower end surface opposing the thrust plate, a disk mounted on the shaft, a rotary cylinder disposed coaxially with the disk, a fixing member fixing the rotary cylinder to the disk, a magnetic head mounted on the rotary cylinder, and another part of the motor mounted on the disk, wherein the rotary portion has a first surface extending perpendicular to the axis of rotation of the rotary cylinder and the stationary part has a second surface extending perpendicular to the axis of rotation of the rotary cylinder and confronting the first surface, a first gap being established between the first surface and the second surface when the rotary cylinder is rotating, and a second gap smaller than the first gap existing between the first surface and the second surface when the rotary cylinder is stopped, said method comprising:

providing the rotary cylinder device in an assembly state in which the rotary cylinder has not yet been fixed to the disk;

spacing the first surface and the second surface apart from each other to such an extent that the gap between the first surface and the second surface is wider than the second gap;

placing the rotary cylinder on the disk so as to be coaxial with the disk; and fixing the new rotary cylinder to the disk with a fixing member while the gap between the first surface and the second surface is wider than the second gap.

14. A method according to claim 13, wherein the spacing of the surfaces apart from each other comprises inserting an insertion member having a thickness greater than the width of the second gap between the first surface and the second surface while the rotary cylinder is stopped.

15. A method according to claim 14, wherein the part of the motor mounted on the stationary cylinder is a motor magnet and the part of the motor mounted on the disk is a motor coil, and wherein said insertion member is inserted between a surface of the motor coil constituting the first surface and a surface of the motor magnet constituting the second surface.

16. A method for detaching and attaching a rotary cylinder of a rotary cylinder device comprising: a stationary portion which comprises a stationary cylinder, a thrust plate fixed to the stationary cylinder, and a part of a motor mounted on the stationary cylinder; and a rotary portion which comprises a shaft mounted on the stationary cylinder via a hydrodynamic bearing so as to be rotatable with respect to the stationary cylinder and axially movable to a certain extent, the shaft having a lower end surface opposing the thrust plate, a disk mounted on the shaft, a rotary cylinder disposed coaxially with the disk, a fixing member fixing the rotary cylinder to the disk, a magnetic head mounted on the rotary cylinder, and another part of the motor mounted on the disk, wherein the rotary portion has a first surface extending perpendicular to the axis of rotation of the rotary cylinder and the stationary part has a second surface extending perpendicular to the axis of rotation of the rotary cylinder and confronting the first surface, a first gap being established between the first surface and the second surface when the rotary cylinder is rotating, and a second gap smaller than the first gap existing between the first surface and the second surface when the rotary cylinder is stopped, said method comprising:

spacing the first surface and the second surface apart from each other to such an extent that the gap between the first surface and the second surface is wider than said second gap;

removing the fixing member from the rotary cylinder while the gap between the first surface and the second surface is wider than the second gap;

subsequently taking the rotary cylinder off of the disk;

placing a new rotary cylinder on the disk so as to be coaxial with the disk; and fixing the new rotary cylinder to the disk with the fixing member while the gap between the first surface and the second surface is wider than the second gap.

* * * * *